(12) United States Patent
Gong

(10) Patent No.: US 6,461,702 B2
(45) Date of Patent: *Oct. 8, 2002

(54) COATED MEMBRANE WITH AN APERTURE FOR CONTROLLED ATMOSPHERE PACKAGE

(75) Inventor: Sannai Gong, Salinas, CA (US)

(73) Assignee: River Ranch Fresh Foods-Salinas, Inc., Salinas, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 105 days.

(21) Appl. No.: 09/268,763

(22) Filed: Mar. 15, 1999

(65) Prior Publication Data
US 2001/0008677 A1 Jul. 19, 2001

(51) Int. Cl.[7] .................. B29D 22/00; B29D 23/00; B32B 1/08; B32B 27/00; B65B 55/00
(52) U.S. Cl. .................. 428/36.6; 428/35.7; 428/131; 428/500; 428/515; 428/516; 428/517; 428/519; 426/118; 426/395
(58) Field of Search .............. 428/35.7, 36.6, 428/131, 500, 515, 516, 517, 519, 521, 523; 252/188.23; 426/118, 106, 395, 418, 419

(56) References Cited

U.S. PATENT DOCUMENTS

| | | | |
|---|---|---|---|
| 3,507,667 A | 4/1970 | Magnen | 99/171 |
| 4,769,262 A | * 9/1988 | Ferrar et al. | 428/35 |
| 6,013,293 A | * 9/1988 | De Moor | 426/106 |
| 4,842,875 A | * 6/1989 | Anderson | 426/118 |
| 4,879,078 A | * 11/1989 | Antoon, Jr. | 264/41 |
| 4,910,032 A | 3/1990 | Antoon, Jr. | 426/118 |
| 4,923,650 A | 5/1990 | Antoon, Jr. et al. | 264/41 |
| 4,923,703 A | 5/1990 | Antoon, Jr. | 426/118 |
| 4,939,030 A | 7/1990 | Tsuji et al. | 428/315.5 |
| 4,996,071 A | 2/1991 | Bell | 426/415 |
| 5,045,331 A | * 9/1991 | Antoon, Jr. | 426/118 |
| 5,165,947 A | * 11/1992 | Colucci et al. | 426/124 |

* cited by examiner

Primary Examiner—Harold Pyon
Assistant Examiner—Michael C. Miggins
(74) Attorney, Agent, or Firm—LaRiviere, Grubman & Payne, LLP

(57) ABSTRACT

A coated membrane for use in controlling the oxygen and carbon dioxide ratio inside of a package that holds respiring produce such as fruits, vegetables or flowers. The coated membrane comprises a porous substrate, such as a polypropylene film, and has an oxygen permeance in the range of 5,000 to 30,000,000 cc/100 in$^2$-atmosphere-day. The substrate is coated with a material that is substantially impermeable to oxygen, such as an acrylic emulsion, so that the amount of substrate surface area covered with the coating causes a decrease in the oxygen permeance of the substrate. The coating is applied to the substrate using a flexographic or rotogravure or rotary silkscreen process. An aperture of approximately 0.15 mm is placed in the coated membrane to allow the internal pressure to approximate the external pressure without a significant loss of relative humidity.

19 Claims, 3 Drawing Sheets

COATED MEMBRANE WITH AN APERTURE FOR CONTROLLED ATMOSPHERE PACKAGE

This is a continuing patent application of application Ser. No. 09/268,763, filed Mar. 15, 1999.

TECHNICAL FIELD

This invention relates to the field of packaging for respiring items such as fresh fruits and vegetables and more particularly to a coated porous membrane for use in controlling the flow of oxygen and carbon dioxide into and/or out of a produce container.

BACKGROUND ART

It is well-known that the eating qualities and/or appearance of respiring items such as fresh fruits, vegetables and flowers (hereinafter "produce") can be preserved by controlling the atmosphere inside of the package that holds the produce. For example, U.S. Pat. No. 4,842,875, issued to H. Anderson on Jun. 27, 1989, describes a basic approach that involves controlling the flow of oxygen and carbon dioxide into and out of the container that holds the produce. The container, called a "controlled atmosphere package," is comprised of a substantially gas-impermeable package having one or more panels made of a microporous plastic membrane having an oxygen permeability in the range of 77,500 to 465,000,000 cc/m$^2$-atmosphere-day. By varying the permeability and/or size of the panel, various optimized oxygen and carbon dioxide levels inside the package can be maintained for extended periods of time thereby providing a method for retarding the maturation processes of various produce commodities.

U.S. Pat. No. 4,923,703, issued to M. Antoon on May 8, 1990, describes a microporous film for use as a panel in a controlled atmosphere package, comprised of a uniaxially oriented polyolefin film with an inert filler.

U.S. Pat. No. 4,910,032, issued to M. Antoon on Mar. 20, 1990, describes a controlled atmosphere package, having a first membrane comprised of a uniaxially or biaxially oriented polymer film that is permeable to oxygen and carbon dioxide, and a second membrane that is permeable to water but impermeable to oxygen and carbon dioxide.

U.S. Pat. No. 4,879,078, issued to M. Antoon on Nov. 7, 1989, and U.S. Pat. No. 4,923,650, issued to M. Antoon on May 8, 1990 describe methods for preparing microporous films that can be used in controlled atmosphere packaging for produce.

Additional patents that deal with this field include U.S. Pat. No. 4,939,030, issued to S. Tsuji et al. on Jul. 3, 1990, which discloses a three-layer film, including a vinyl acetate layer, for use in produce packaging; and U.S. Pat. No. 4,996,071, issued to L. Bell on Feb. 26, 1991, which discloses varying the surface area of the film to control the atmosphere inside of a produce package.

Additional patents dealing with this field but which are not considered to be material to the present invention include U.S. Pat. No. 3,625,876, issued to C. Fitko on Dec. 7, 1971; U.S. Pat. No. 4,769,262, issued to A. Ferrar et al. on Sep. 6, 1988; and U.S. Pat. No. 5,026,591, issued to R. Henn et al. on Jun. 25, 1991.

All of this prior art teaches that in order to establish and maintain different oxygen/carbon dioxide ratios inside of the package, either the permeability of the microporous membrane must be changed by altering the chemical formulation of the film used to make the membrane, or the size of the membrane panel must be changed.

DISCLOSURE OF INVENTION

The present invention comprises a coated porous membrane panel with a pin-hole aperture for use with a container that holds produce. The coated porous membrane panel with a small aperture is positioned in contact with, and over a hole in a substantially non-porous container for providing an area through which a limited volume of carbon dioxide and oxygen can flow at a rate (permeability) between the inside of the container and the outside ambient atmosphere which is within a range specific to the type and amount of produce in the package. The small aperture is positioned near the center of the hole in the container. The combination of the non-porous container and the coated porous membrane panel with a small aperture retards the maturation of the produce by allowing the concentration of oxygen and carbon dioxide inside the container to stabilize within a range of concentration reasonably optimal for the type of produce within the package. The coated porous membrane panel of the present invention may be comprised of a base substrate such as polypropylene or polyethylene, a nonwoven substrate made from these polymers, or paper (hereinafter "substrate") which has a permeability rate to oxygen and carbon dioxide in a range of, for example, 77,500 to 465,000,000 cc/m$^2$-atmosphere-day (5,000 to 30,000,000 cc/100 in$^2$-atmosphere-day). This range is then reduced to a desired level suitable for the type and amount of produce to be packaged by applying to said substrate a coating of a porosity-reducing, film-forming substance, such as an acrylic-based polymer, which by coat weight (thickness) and/or pattern of application, decreases the permeability rate of the substrate to a desired range of permeance rates. The percent reduction in the oxygen and carbon dioxide permeability rate of the substrate can be varied 15 percent to almost 100 percent by varying the aforementioned characteristics of the coating applied to it. The small aperture allows the pressure inside of the container to approximate the pressure outside of the container preventing overpressurization and underpressurization without drying out the produce. Overpressurization or underpressurization of hermetically sealed produce packages occurs frequently as a result of produce respiration activities within packages or when packages are shipped over a mountainous range due to altitude changes.

The coated porous membrane panel of the present invention differs from the porous membrane panel described in the prior art (e.g., by Antoon in U.S. Pat. No. 4,879,078) in that the prior art varies the constituents of the membrane material to produce membranes of varying permeabilities, whereas in the present invention, a single substrate with a small aperture can be used to produce different membranes for different types and/or amounts of produce by simply varying the characteristics of a porosity-reducing coating material applied to the single substrate or by varying percent area on a single substrate where a coating is applied and in that the small aperture prevents overpressurization and underpressurization while maintaining relative humidity.

BRIEF DESCRIPTION OF DRAWINGS

For fuller understanding of the present invention, reference is made to the accompanying drawing in the following Best Mode of Carrying Out the Invention. In the drawing.

Figure 1:
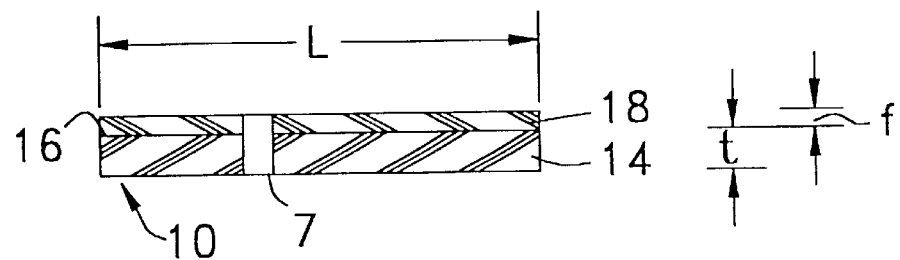
FIG. 1 is a schematic cross-sectional representation of a coated membrane according to the present invention.

Reference numbers refer to the same or equivalent parts of the present invention throughout the several figures of the drawing.

BEST MODE OF CARRYING OUT THE INVENTION

FIG. 1 is a schematic cross-sectional illustration of a coated membrane 10 with a single and small pinhole aperture 7 according to the present invention. The membrane 10 comprises a substrate 14 and a coating 18 that is applied to a surface 16 of the substrate 14 to decrease the permeability of substrate 14 to oxygen and carbon dioxide. The surface 16 is a face of the substrate 14 through which oxygen and carbon dioxide must pass in order to flow through the substrate 14.

The substrate 14 may be any porous material having the following characteristics: (1) the permeability to oxygen should be in the range of 77,500 to 465,000,000 $cc/m^2$-atmosphere-day (5,000 to 30,000,000 $cc/100\ in^2$-atmosphere-day); (2) the substrate 14 must be compatible with the coating 18, with an adhesive and with printing ink; and (3) the $CO_2/O_2$ permeability ratio of the substrate 14 can range from 1:1 to 8:1 with the preferred range being 1:1 to 4:1.

In the preferred embodiment, the substrate 14 is a microporous polypropylene film such as the film described by Antoon in U.S. Pat. No. 4,879,078 (i.e., comprised of a uniaxially oriented film comprised of a blend of 36% to 60% by weight of propylene homopolymer or propylene/ethylene copolymer, 36% to 60% of calcium carbonate filler based on the total weight of the polymer and filler, 0.10–2.5% by weight of calcium stearate, and 0–1.5% by weight of stabilizer). Although there is no preferred shape or size for the membrane 10, for reference purposes only, the substrate 14 typically has a length "L" in the range of 1.0 to 4 inches and a thickness "t" in the range of 5.0 to 10.0 mil. In general, any of the polymers described by Antoon in U.S. Pat. No. 4,879,078 can be used as the substrate 14, including the polyolefin homopolymers described therein.

Numerous other materials having the characteristics listed above may be used as the substrate 14, including the microporous polymer films described by Anderson in U.S. Pat. No. 4,842,875 that utilize a variety of inorganic fillers such as clay, barium sulfate, calcium carbonate, silica, diatomaceous earth and titania, and those using organic polymer fillers such as polyesters, polyamides and polystyrene.

It has also been observed that the substrate 14 may be comprised of a coated or uncoated paper having a weight in the range of 55 lbs. to 110 lbs. (e.g. the TEXAPRINT brand paper or white C1S latex impregnated paper manufactured by Kimberly-Clark). The clay coated paper should also have the permeability and compatibility characteristics listed above.

The coating 18 used on porous substrate 14 may be any material that substantially reduces the permeability of the substrate 14 to oxygen and carbon dioxide. Such materials are typically referred to as "barrier coatings" and include acrylic emulsion polymers, polyvinyl acetate homopolymer emulsions, and nitrocellulose polymers. For practical reasons, other desirable characteristics for the coating 18 include: water resistance, FDA approval for indirect food contact, and good film forming qualities, namely the ability to form a continuous barrier coating 18 that can be applied to the substrate 14.

In the preferred embodiment, the coating 18 comprises an acrylic based polymer supplied by Johnson & Johnson under the trademark JONCYRYL 74F. ICI also markets an acceptable acrylic based polymer under the trademark NeoCryl® which may be used as the coating 18. For reference purposes, the coating 18 generally has a coatweight of about 45% (i.e. about 45% by weight of solids), and a thickness "f" of about 0.25 to 0.5 mil. When paper is used as the substrate, porosity-reducing coating layer 18 may consist of the ink used to print information on the paper (i.e., experiments have shown that 80-lb clay-coated paper, for example, absorbs sufficient ink to reduce the permeability of the paper approximately 70%). The coating 18 may be applied to the substrate 14 in-line during a label making process, or the substrate 14 may be coated off-line using standard printing processes.

In the label manufacturing process, a roll of substrate material is converted to pressure-sensitive adhesive labels. The conversion process involves running a roll of substrate material through a label manufacturer's printing press where the substrate material's top surface is printed with inks, the perimeter of the back surface is coated with adhesive, the labels are die-cut into desired label shapes, and the resulting master roll of labels is slit and wound into individual rolls of labels that are dispensed onto packages by the food packer.

Flexography is a widely used process for printing roll-fed pressure sensitive, self-adhesive labels. Flexography is a relief-printing technique. The first step is to make a flexible printing plate of rubber or plastic, with the print image area of the plate raised above the nonimage areas. The flexible plate is wrapped around a cylinder and placed in one of several printing stations of a flexographic press. Ink rollers on the press touch only the top surface of the raised image area of the flexo plate, and ink is transferred directly from the image areas of the plate to the substrate to be printed. After applying the ink to the top surface of the substrate, adhesive is applied to the back surface, and the labels are passed through a drying station, a die cutting station, and wound onto a take-up roll.

Flexographic printing processes and gravure printing processes are described in the book "Printing Ink Handbook" compiled by Product and Technical Publications Committee, National Association of Printing Ink Manufacturers, Inc, 1976.

Figure 2:
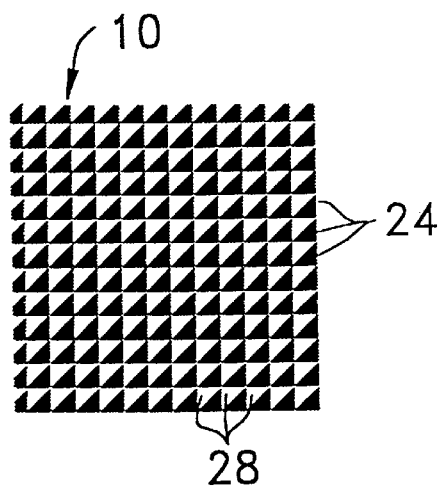
FIG. 2 is a top view of a membrane having the coating applied in a triangular pattern.

FIG. 2 illustrates a top view of the coated membrane 10 in which the coating 18 is applied as a repeating pattern of triangles using the flexographic process. In FIG. 2, the dark triangles 24 represent areas to which the coating 18 has been applied, while the light triangles 28 represent areas to which no coating has been applied. Therefore, the light triangles 28 represent the exposed surface 16 of the substrate 14.

Figure 3:
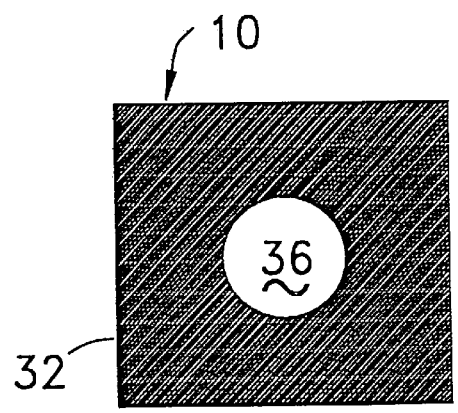
FIG. 3 is a top view of a membrane having the coating applied as a solid pattern.

Similarly, in FIG. 3 the coating 18 is represented by a dark area 32 and the exposed surface 16 of the substrate 14 is represented by the light area 36.

The coating patterns illustrated in FIGS. 2 and 3 are illustrative of a virtually unlimited number of possible coating patterns. Any pattern that decreases the uncoated, permeable area of the substrate 14 is acceptable for use in the present invention.

Figure 4:
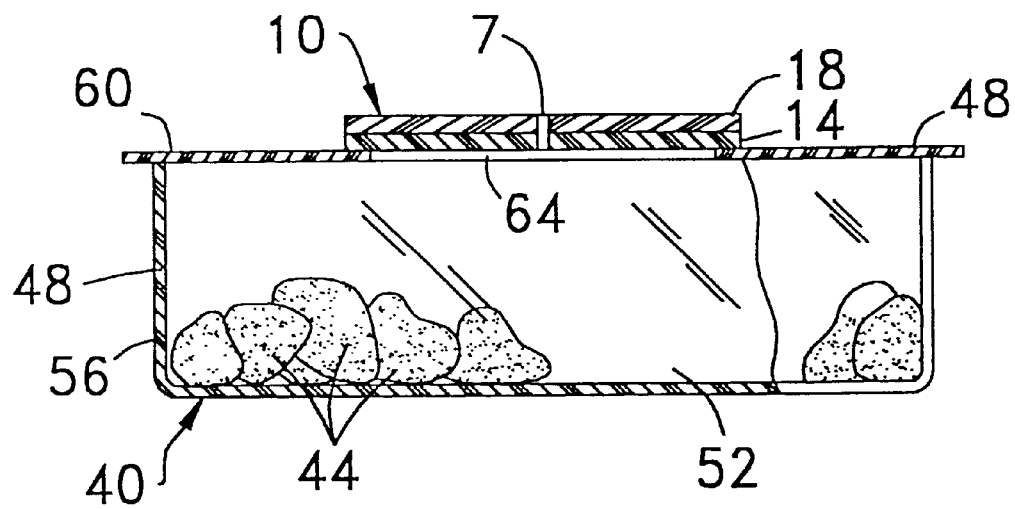
FIG. 4 is a cross-sectional view of a container with a small aperture near the center of a hole according to the present invention.

FIG. 4 illustrates a rigid container 40 for holding respiring produce 44. The term "respiring items" means items that respire in the biochemical sense of the word (i.e. that take in oxygen and give off carbon dioxide). The container 40 is comprised of a substantially impermeable packaging material 48 that surrounds the produce and holds it in a chamber 52 formed by the packaging material 48. The container 40 thus prevents any appreciable exchange of oxygen or carbon dioxide from within or outside container 40 except through the membrane 10.

In the preferred embodiment, the packaging material 48 is approximately 15–20 mil thick PVC. However, as is described in U.S. Pat. No. 4,842,875, any substantially impermeable material suitable for packaging produce, like glass, metal or a wide range of plastics (e.g. polyolefins and polystyrene) can be used for the packaging material 48. The term substantially impermeable is defined in U.S. Pat. No. 4,842,875 and means that no appreciable amount of oxygen can pass through the packaging material 48.

In FIG. 4, the container 40 is shown as having the shape of a basket with a bottom part 56 and a top part 60 that fit tightly together in a gas-tight manner. However, it should be appreciated that the container 40 can take other forms, such as a 3 mil thick polyethylene bag, having a 4.0% ethylene/vinyl acetate content. The only requirements for the container 40 is that it be comprised of the substantially impermeable packaging material 48 and that it surround and hold the produce 44 in a chamber 52 so that the only passageway for oxygen to reach or leave the chamber 52 is through the membrane 10.

A hole 64 exists in the container 40. The hole 64 is an open region in the container 40 not covered by the packaging material 48. The membrane 10 is positioned over or about the hole 64 so as to prevent gasses such as oxygen and carbon dioxide from passing between the chamber 52 and the ambient atmosphere without passing through the membrane 10. The small aperture 7 in the membrane 10 is located near the center of the hole 64. It is preferred to have the small aperture 7 near the center of the hole 64 so that if the membrane 10 shifts the small aperture 7 will remain far enough from the packaging material 48 to prevent the packaging material from plugging the aperture 7.

In the preferred embodiment, the aperture 7 is 0.006 inches (0.15 mm) in diameter. The aperture diameter may be in the range from 0.004 to 0.008 inches (0.10 to 0.20 mm). The preferred embodiment uses a single aperture, however it may be desirable to use up to five apertures.

Figure 5:
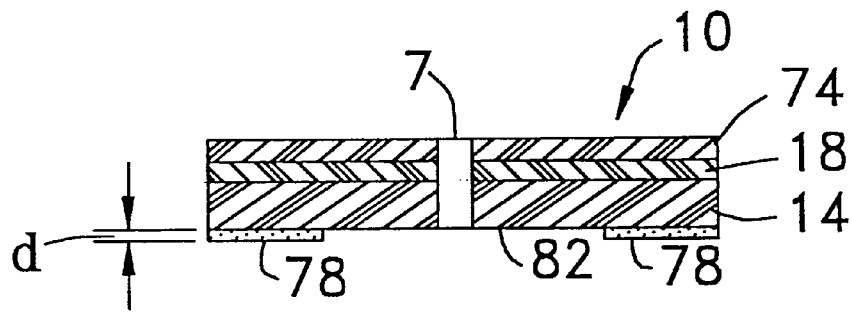
FIG. 5 is a schematic cross-sectional representation of a coated membrane having an ink layer and an adhesive layer.

FIG. 5 illustrates a membrane 10 with a small aperture 7 and in which an ink layer 74 has been printed on top of the coating 18. The ink layer 74 is comprised of ink, water-based or otherwise, that is permeable to oxygen and carbon dioxide and functions merely to convey printed information, such as information about the produce 44, to the consumer.

An adhesive 78 has been applied to the side of the substrate 14 not containing the ink layer 74. The finished label adhesive thickness "d" should be about 1.2 mil±0.3 mil. The primary function of the adhesive 78 is to attach the substrate 14 to the packaging material 48. Any pressure-sensitive label adhesive that is approved for indirect food contact can be used as the adhesive 78.

As is shown in FIG. 5, generally the adhesive 78 is applied around the outer edges of the substrate 14 so as to leave a region 82 on the substrate 14 that is not covered with adhesive 78. Since the adhesive areas 78 are attached to the packaging material 48, the part of the membrane 10 that is "over" the adhesive areas 78 is effectively impermeable to oxygen and carbon dioxide. Thus, only the part of the membrane 10 that is "over" the region 82 is a "breathable" area through which oxygen and carbon dioxide can pass.

Figure 6:
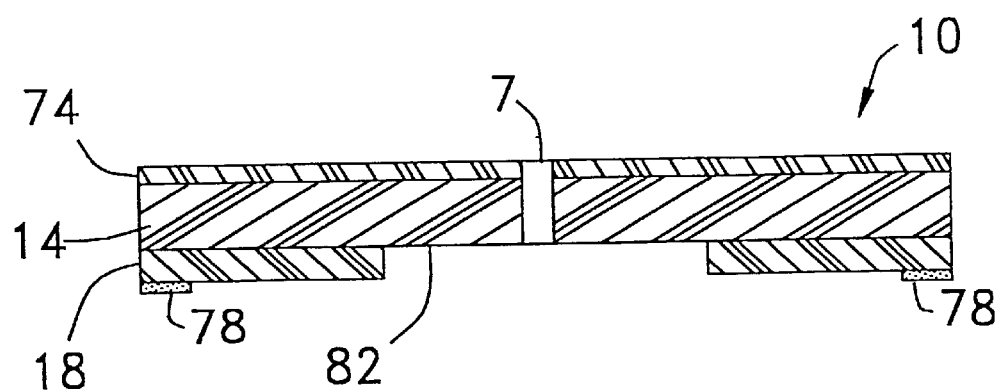
FIG. 6 is a schematic cross-sectional representation of another coated membrane having an ink layer and an adhesive layer.

FIG. 6 illustrates another membrane 10 with a small aperture 7 and in which an ink layer 74 has been printed on top of the substrate 14. The ink layer 74 is comprised of ink, water-based or otherwise, that is permeable to oxygen and carbon dioxide and functions merely to convey printed information, such as information about the produce 44, to the consumer. The coating 18 is below the substrate 14. In this embodiment, the coating 18 is applied in two applications (or layers or coats) to increase the coatings 18 impermeability to oxygen and carbon dioxide. It should be appreciated that the relative positions of the substrate 14, the coating 18 and the ink layer 74 are not important, since in this embodiment the substrate 14 is located between the ink layer 74 and the coating 18. The ink layer 74 could be located between the substrate 14 and the coating 18 provided that coating 18 is transparent.

An adhesive 78 has been applied to a side of the coating 18. The finished label adhesive thickness should be about 1.2 mil±0.3 mil. The primary function of the adhesive 78 is to attach the membrane 10 to the packaging material 48. Any pressure-sensitive label adhesive that is approved for indirect food contact can be used as the adhesive 78.

As is shown in FIG. 6, generally the adhesive 78 is applied around the outer edges of the membrane so as to leave a region 82 of the membrane 10 that is not covered with adhesive 78. Since the adhesive areas 78 are attached to the packaging material 48, the part of the membrane 10 that is "over" the adhesive areas 78 is effectively impermeable to oxygen and carbon dioxide. Thus, only the part of the membrane 10 that is "over" the region 82 is a "breathable" area through which oxygen and carbon dioxide can pass.

Referring to FIGS. 1–6, the functioning of the present invention can now be explained. The coating 18 is applied to the substrate 14 to decrease the permeability of substrate 14. In theory, for a substrate 14 having a fixed surface area, the permeability can be decreased by any amount between 0 and 100% by applying the coating 18 to an appropriate area of the substrate 14. It is thought that the coating 18 reduces the permeability of the substrate 14 by blocking the pores that exist in the substrate 14 that provide passageways for the flow of oxygen or carbon dioxide through the substrate 14.

By applying the coating 18 to the substrate 14 in a pattern that covers less than an entire surface of the substrate 14, the permeability of the substrate 14 can be reduced by a value less than 100%. For example, in FIG. 2, the dark triangles 24 cover approximately 80% of the surface area of the substrate 14 and therefore are expected to decrease the oxygen permeability by about 80%. Similarly, in FIG. 3, if the coating 18 covers about 50% of the surface area of the substrate 14, as represented by the dark area 32, then it is expected that the oxygen permeability of the coated membrane shown in FIG. 3 would be reduced by 50% compared to the permeability of the uncoated substrate 14.

In practice, a one-to-one relationship between the surface area coated and the reduction in effective permeability is not observed. Generally, the observed reduction in effective permeability is somewhat less than would be expected if the coating was a perfectly effective pore blocker. For example, when a 50% pattern was used, a 31% decrease in permeability was observed.

If the pressure outside of the container becomes less than the pressure inside of the container, the coated membrane will begin to bulge, making the membrane more susceptible to damage and making the container unsightly. If the pressure outside of the container becomes greater than the pressure inside of the container, the membrane collapses inward making the membrane more susceptible to damage. The aperture 7 allows air into and out of the container to allow the inside pressure and outside pressure to equalize. The smallness of the aperture 7 still allows the membrane to maintain 95% to 100% relative humidity inside the package.

A major advantage of the present invention is that by using patterns of differing surface areas, a single substrate 14, having a fixed oxygen permeance, and having a small aperture 7 can be used to prepare a variety of membranes 10 that have different permeabilities after the coating 18 is applied in different patterns and different coating weights and formulations, while keeping the pressure inside of the container approximately equal to the pressure outside of the container. This is useful because in order to optimize the storage life of different types of produce 44, membranes 10 of varying oxygen permeability are required.

In the preferred embodiment, the coating 18 is applied to the substrate 14 using a flexographic process. In the flexographic process, a flexible rubber or plastic plate ("Flexo Plate") is made having an image of the coating pattern which is to be transferred to the substrate 14 (e.g. the patterns shown in FIGS. 2 and 3). During the conversion, the coating material is transferred from the raised or image areas of the Flexo Plate to the substrate in the desired pattern.

In order to obtain reproducible results from run to run using the flexographic process, parameters such as the following should be controlled (the listed parameter values were selected as optimal for the particular flexographic system used with the present invention): 1. The actual temperatures of the drier and adhesive should be maintained at a constant value (ink drying—150° F.; adhesive pan temperature—340° F.); 2. The viscosity of the coating should be maintained at a constant value (generally about 200–250 cp); 3. The Flexo Plate to substrate pressure should be uniform and the Flexo Plate should be cleaned periodically during the run; 4. The run speed should be maintained at a constant value (generally about 80 ft./min.); and 5. The analox roll should be cleaned periodically during the run— typically, about every 1000 impressions (a 300 line analox roll with a doctor blade has been used for all coating runs).

In the preferred embodiment the aperture is created on the press by employing a rotary dye immediately following the printing.

While the flexographic process is the presently preferred method of producing the membranes 10, it should be appreciated that any method of applying a coating to a substrate could be used, including rotogravure processes, letter press processes and rotary silkscreen processes.

Although in the preferred embodiment the aperture has a diameter between 0.004 to 0.008 inches (0.10 to 0.20 mm), in the practice of the invention, the aperture may be between 0.001 and 0.01 inches (0.025 to 0.25 mm).

The present invention has been particularly shown and described with respect to certain preferred embodiments of features thereof. However, it should be readily apparent to those of ordinary skill in the art that various changes and modifications in form and details may be made without departing from the spirit and scope of the invention as set forth in the appended claims.

I claim:

1. A membrane member for regulating the ratio of oxygen and carbon dioxide inside of a container that holds respiring items comprising:

a non-fibrous substrate having a permeability to oxygen in the range of 5,000 to 30,000,000 cc/100 in$^2$-atmosphere-day;

a coating applied to a surface of the substrate in a specific pattern chosen to have some wholly uncoated area, said coating facilitating a decrease in said permeability to oxygen by fifteen percent to ninety percent; and said membrane member having an aperture wherein said aperture has a diameter sized between 0.025 mm and 0.25 mm.

2. The membrane member of claim 1 wherein the uncoated area of the pattern is between 0.1 cm$^2$ and 10 cm$^2$.

3. The membrane member of claim 2 wherein the diameter of the aperture is 0.15 mm.

4. A membrane member as in claim 1 wherein the pattern having some uncoated area is selected from the group consisting essentially of circle, ellipse, polygon and closed curve.

5. A container for retarding the maturation of respiring items comprising:

a package means for substantially surrounding a respiring item and holding the respiring item in an internal chamber formed by the package means, the package means being comprised of a material that is essentially impermeable to oxygen and carbon dioxide and wherein the package comprising an opening on a side of the package;

at least one non-fibrous substrate attached externally to said package means for providing a limited flow of carbon dioxide and oxygen between said internal chamber and the ambient atmosphere and being comprised of a calcium carbonate-filled uniaxially oriented polymer film comprised of 36% to 60% by weight of polyolefin polymer and 36% to 60% by weight of calcium carbonate based on the weight of the polymer and calcium carbonate, and having a permeability to oxygen in the range of 5,000 to 30,000,000 cc/100 in$^2$-atmosphere-day, and wherein at least a part of said substrate covers said opening in the package;

a coating means applied to said substrate in a specific pattern chosen to have some wholly uncoated area, said coating means facilitating a decrease in the permeability of said substrate to oxygen or carbon dioxide by more than fifteen percent and comprised of an acrylic polymer; and an aperture for adjusting to changes in ambient atmospheric pressure.

6. The container of claim 5 wherein the uncoated area of the pattern is between 0.1 cm$^2$ and 10 cm$^2$.

7. The container of claim 5 wherein the aperture has a diameter in the range of 0.025 mm to 0.25 mm.

8. The container of claim 5 wherein the aperture has a diameter of 0.15 mm.

9. The container of claim 5 wherein the polyolefin polymer comprises a propylene homopolymer.

10. The container of claim 5 herein the polyolefin polymer comprises a propylene/ethylene copolymer.

11. A container as in claim 5 wherein the pattern having some uncoated area is selected from the group consisting essentially of circle, ellipse, polygon and closed curve.

12. A container for retarding the maturation of respiring items comprising:

a package means for substantially surrounding a respiring item and holding the respiring item in an internal chamber formed by the package means, the package means being comprised of a material that is essentially impermeable to oxygen and carbon dioxide and wherein the package comprises an opening on a side of the package;

a membrane member for covering said opening;

wherein said membrane member comprises at least one non-fibrous substrate for providing a limited flow of carbon dioxide and oxygen between said internal chamber and the ambient atmosphere, the substrate being positioned externally in contact with said package means and having a permeability to oxygen in the range of 5,000 to approximately 30,000,000 cc/100 in$^2$-atmosphere-day, and wherein at least a part of the substrate covers said opening in the package; and wherein said membrane member further comprises a coating means applied to said substrate, said coating means applied in a specific pattern chosen to have some wholly uncoated area, said coating means facilitating a decrease in the permeability of said substrate to oxygen or carbon dioxide by more than fifteen percent; and an aperture for adjusting to changes in ambient atmospheric pressure.

13. The container of claim 12 wherein the uncoated area of the pattern is between 0.1 cm$^2$ and 10 cm$^2$.

14. The container of claim 12 wherein the aperture has a diameter in the range of 0.025 mm to 0.25 mm.

15. The container of claim 14 wherein the aperture has a diameter of 0.15 mm.

16. The container of claim 12 wherein the package means comprises a polymeric container.

17. The container of claim 12 wherein the substrate comprises a polymeric film.

18. The container of claim 12 wherein the coating means comprises an acrylic polymer.

19. A container as in claim 12 wherein the pattern having some uncoated area is selected from the group consisting essentially of circle, ellipse, polygon and closed curve.

* * * * *